United States Patent
Yang (10) Patent No.: US 9,074,783 B2
(45) Date of Patent: Jul. 7, 2015

(54) TEMPERATURE REGULATION SYSTEM WITH HYBRID REFRIGERANT SUPPLY AND REGULATION

(76) Inventor: Tai-Her Yang, Dzan-Hwa (TW)

( * ) Notice: Subject to any disclaimer, the term of this patent is extended or adjusted under 35 U.S.C. 154(b) by 114 days.

(21) Appl. No.: 12/944,782

(22) Filed: Nov. 12, 2010

(65) Prior Publication Data

US 2012/0117994 A1    May 17, 2012

(51) Int. Cl.
*F25B 49/00* (2006.01)
*F25B 1/00* (2006.01)
*F25B 39/02* (2006.01)
*F24F 11/00* (2006.01)
*F25B 49/02* (2006.01)

(52) U.S. Cl.
CPC .............. *F24F 11/001* (2013.01); *F24F 11/008* (2013.01); *F25B 49/02* (2013.01); *F25B 2313/008* (2013.01); *F25B 2600/025* (2013.01); *F25B 2600/111* (2013.01); *F25B 2600/2513* (2013.01); *Y02B 30/743* (2013.01)

(58) Field of Classification Search
CPC .................................. F25B 13/00; F25D 9/00
USPC ........................................................... 62/132
See application file for complete search history.

(56) References Cited

U.S. PATENT DOCUMENTS

| | | | |
|---|---|---|---|
| 5,551,249 A * | 9/1996 | Van Steenburgh, Jr. | 62/196.4 |
| 5,813,242 A * | 9/1998 | Lawrence et al. | 62/156 |
| 6,866,092 B1 * | 3/2005 | Molivadas | 165/104.21 |
| 7,549,461 B2 * | 6/2009 | Kroliczek et al. | 165/104.26 |
| 2004/0068999 A1 * | 4/2004 | Jessen | 62/222 |
| 2004/0250560 A1 * | 12/2004 | Ikura et al. | 62/236 |
| 2008/0289354 A1 * | 11/2008 | Dudley et al. | 62/335 |
| 2009/0038322 A1 * | 2/2009 | Senf, Jr. et al. | 62/117 |

* cited by examiner

*Primary Examiner* — Alexandra Elve
*Assistant Examiner* — Henry Crenshaw
(74) *Attorney, Agent, or Firm* — Bacon & Thomas, PLLC (57) ABSTRACT

The present invention provides a temperature regulation system with hybrid refrigerant supply and regulation in which a pressure-reducing regulator (R100) from an evaporator (EVA100) controlled by a switch valve (V100) being installed between a condenser (CON100) and the evaporator (EVA100), and a refrigerant injector (IJ100) being installed between the condenser (CON100) and the evaporator (EVA100), and an electric control unit (ECU100) being provided for controlling the switch valve (V100) and the pressure-reducing regulator (R100) or for controlling the refrigerant injector (IJ100) such that both or at least one thereof being served to transport the refrigerant (REF100) into the evaporator (EVA100).

22 Claims, 3 Drawing Sheets

TEMPERATURE REGULATION SYSTEM WITH HYBRID REFRIGERANT SUPPLY AND REGULATION

BACKGROUND OF THE INVENTION (a) Field of the Invention

The present invention provides a temperature regulation system with hybrid refrigerant supply and regulation wherein a pressure-reducing regulator (R100) from an evaporator (EVA100) being controlled by a switch valve (V100) is installed between a condenser (CON100) and the evaporator (EVA100), and a refrigerant injector (IJ100) is installed between the condenser (CON100) and the evaporator (EVA100), and an electric control unit (ECU100) is provided for controlling the switch valve (V100) and the pressure-reducing regulator (R100) or for controlling the refrigerant injector (IJ100), such that both or at least one thereof is served to transport the refrigerant (REF100) into the evaporator (EVA100).

(b) Description of the Prior Art

For a conventional temperature regulation system applied in an air conditioning or freezing device, e.g. an integral or separation type cold/warm air conditioner, icy water type air conditioner, refrigerator and freezers or in a regulation device for lowering/increasing temperature or dehumidifying, the method of transporting refrigerant into an evaporator is to flow through a regulation coil or regulation valve so as to be passively sucked into the evaporator, the diffusion level and uniformity thereof are mostly poor.

SUMMARY OF THE INVENTION

The present invention provides a temperature regulation system with hybrid refrigerant supply and regulation capable of being applied in an air conditioning or freezing device, e.g. an integral or separation type cold/warm air conditioner, icy water type air conditioner, refrigerator and freezers or in a regulation device for lowering/increasing temperature or dehumidifying, in which a conventional pressure-reducing regulator (R100) being in series connected with a switch valve (V100) is parallel connected with a refrigerant injector (IJ100) and are both installed between the fluid outlet of the condenser (CON100) and an evaporator (EVA100), so the temperature regulation system with hybrid refrigerant supply and regulation is structured; and through settings of an operation input device (OID100) and control and regulation of an electric control unit (ECU100) and an driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

DESCRIPTION OF MAIN COMPONENT SYMBOLS

CD100: Driving circuit device
CON100: Condenser
ECU100: Electric control unit
EVA100: Evaporator
F101-F102: Fan
HD100: Liquid refrigerant detector
HE100: Heat exchanger
IJ100: Refrigerant injector
OID100: Operation input device
P100: Pipeline
P200: Secondary side pipeline
PUMP100: Compressing pump
R100: Pressure-reducing regulator
REF100: Refrigerant
TD100: Temperature detector
V100: Switch valve

DETAILED DESCRIPTION OF THE PREFERRED EMBODIMENTS

For a conventional temperature regulation system applied in an air conditioning or freezing device, e.g. an integral or separation type cold/warm air conditioner, icy water type air conditioner, refrigerator and freezers or in a regulation device for lowering/increasing temperature or dehumidifying, the method of transporting refrigerant into an evaporator is to flow through a regulation coil or regulation valve so as to be passively sucked into the evaporator, the diffusion level and uniformity thereof are mostly poor;

The present invention provides a temperature regulation system with hybrid refrigerant supply and regulation wherein a pressure-reducing regulator (R100) from the evaporator (EVA100) being controlled by a switch valve (V100) is installed between a condenser (CON100) and a evaporator (EVA100), and a refrigerant injector (IJ100) is installed between the condenser (CON100) and the evaporator (EVA100), and an electric control unit (ECU100) is provided for controlling the switch valve (V100) and the pressure-reducing regulator (R100) or for controlling the refrigerant injector (IJ100), such that both or at least one thereof is served to transport the refrigerant (REF100) to the interior of the evaporator (EVA100);

The present invention provides a temperature regulation system with hybrid refrigerant supply and regulation capable of being applied in an air conditioning or freezing device, e.g. an integral or separation type cold/warm air conditioner, icy water type air conditioner, refrigerator and freezers or in a regulation device for lowering/increasing temperature or dehumidifying, in which a conventional pressure-reducing regulator (R100) being in series connected with a switch valve (V100) is parallel connected with a refrigerant injector (IJ100) and are both installed between the fluid outlet of the condenser (CON100) and an evaporator (EVA100), so the temperature regulation system with hybrid refrigerant supply and regulation is structured; and through settings of an operation input device (OID100) and control and regulation of an electric control unit (ECU100) and an driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 1:
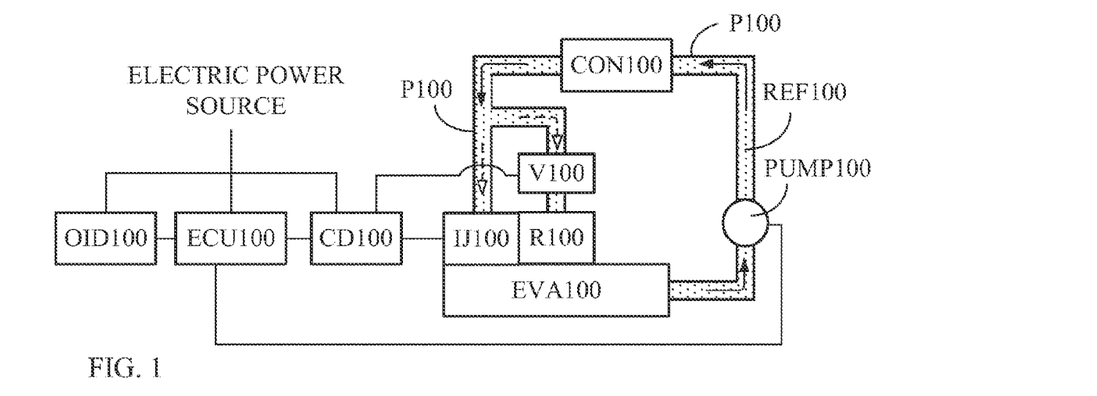
FIG. 1 is a schematic view showing the main system structure of the foundational theories according to the present invention.

According to this invention, embodiments of the temperature regulation system with hybrid refrigerant supply and regulation are as followings:

FIG. 1 is a schematic view showing the main system structure of the foundational theories according to the present invention;

As shown in FIG. 1, it main consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Electric control unit (ECU100): constituted by electromechanical operation devices, solid electric circuit devices and micro processers and related softwares, and provided for receiving commands sent by the operation input device (OID100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 2:
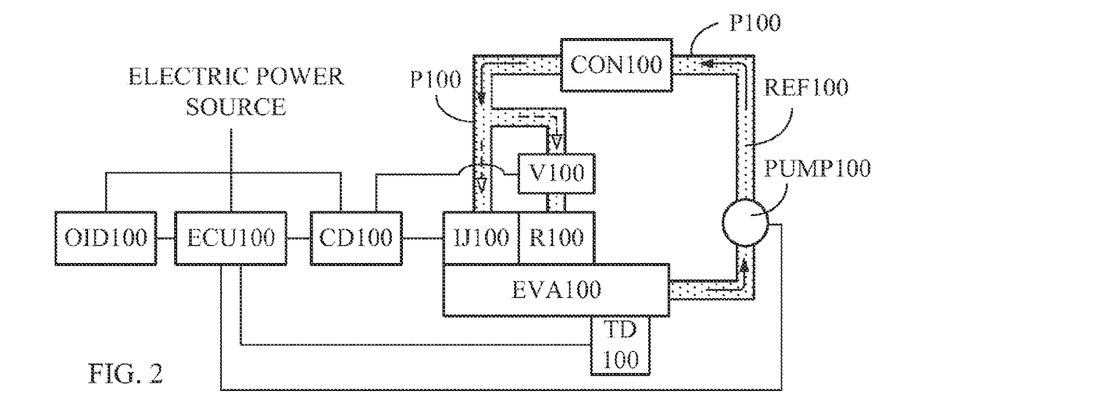
FIG. 2 is a schematic view showing the system structure of FIG. 1 being further installed with a temperature detector (TD100).

FIG. 2 is a schematic view showing the system structure of FIG. 1 being further installed with a temperature detector (TD100);

As shown in FIG. 2, it main consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processers and related softwares, and provided for receiving commands sent by the operation input device (OID100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 3:
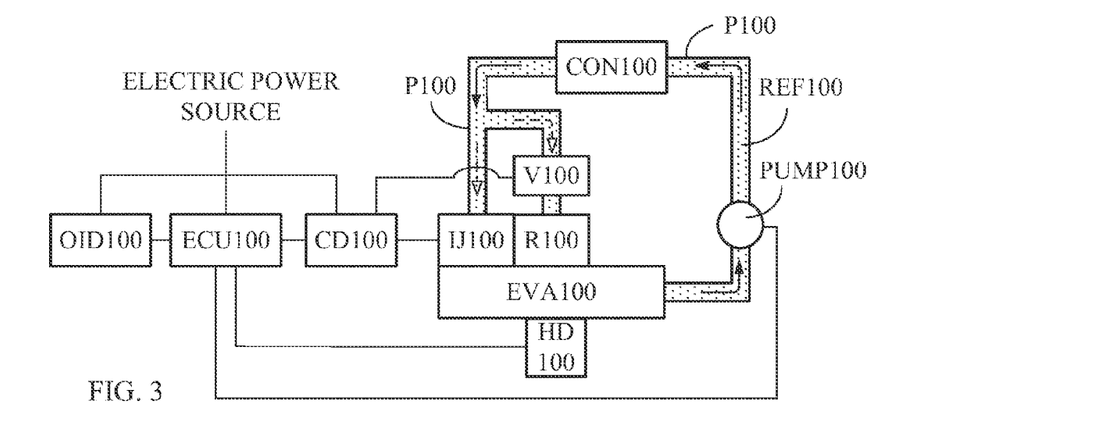
FIG. 3 is a schematic view showing the system structure of FIG. 1 being further installed with a liquid refrigerant detector (HD100).

FIG. 3 is a schematic view showing the system structure of FIG. 1 being further installed with a liquid refrigerant detector (HD100).

As shown in FIG. 3, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Electric control unit (ECU100): constituted by electromechanical operation devices, solid electric circuit devices and micro processers and related softwares, and provided for receiving commands sent by the operation input device (OID100) and the detected signals sent by the liquid refrigerant detector (HD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 4:
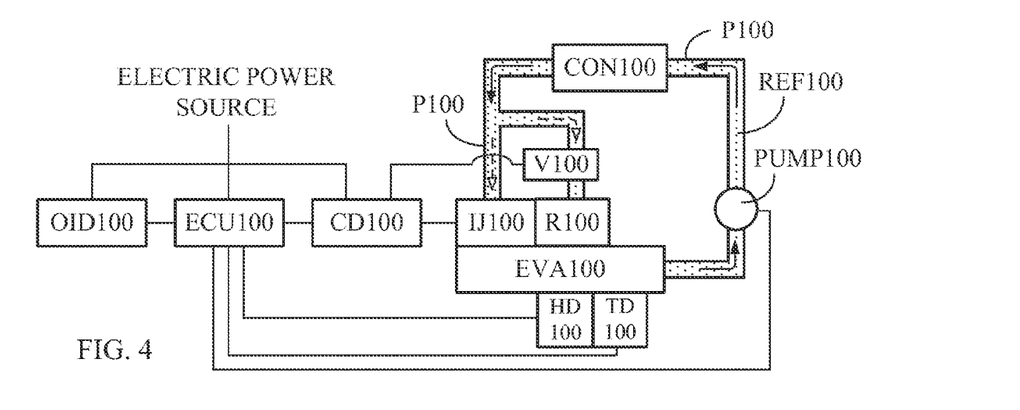
FIG. 4 is a schematic view showing the system structure of FIG. 1 being further installed with a temperature detector (TD100) and a liquid refrigerant detector (HD100).

FIG. 4 is a schematic view showing the system structure of FIG. 1 being further installed with a temperature detector (TD100) and a liquid refrigerant detector (HD100).

As shown in FIG. 4, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processors and related softwares, and provided for receiving commands sent by the operation input device (OID100), the detected signals sent by the liquid refrigerant detector (HD100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 5:
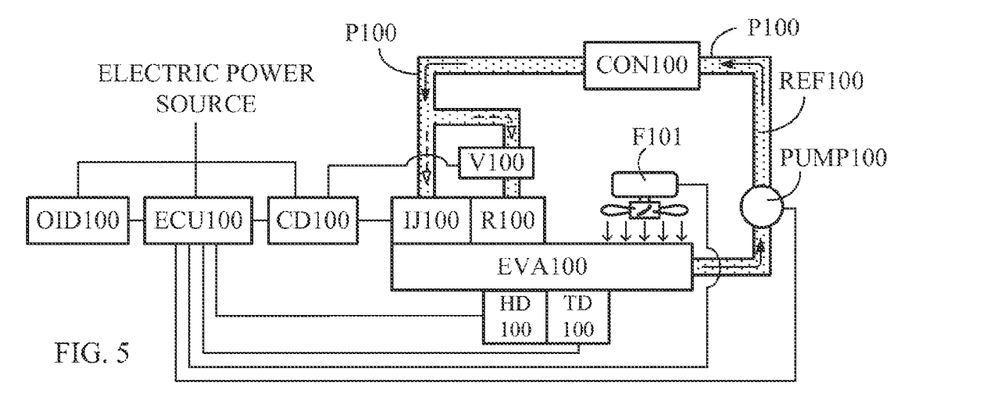
FIG. 5 is a schematic view showing the system structure of FIG. 4 being further installed with a fan (F101) for blowing air flow to pass through the evaporator (EVA100).

FIG. 5 is a schematic view showing the system structure of FIG. 4 being further installed with a fan (F101) for blowing air flow to pass through the evaporator (EVA100).

As shown in FIG. 5, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processors and related softwares, and provided for receiving commands sent by the operation input device (OID100), the detected signals sent by the liquid refrigerant detector (HD100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

Fan (F101): constituted by a fan driven by an electric motor or the mechanical revolving force, and provided for blowing air flow to pass through the evaporator (EVA100), such that the air and the evaporator (EVA100) exchange heat then be discharged;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 6:
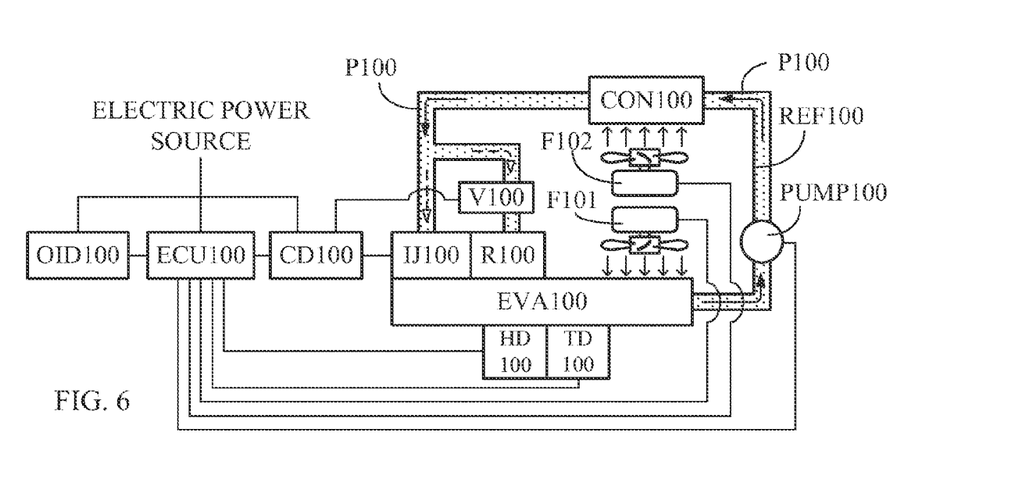
FIG. 6 is a schematic view showing the system structure of FIG. 4 being further installed with a fan (F101) for blowing air flow to pass through the evaporator (EVA100) and a fan (F102) for blowing air flow to pass through the condenser (CON100).

FIG. 6 is a schematic view showing the system structure of FIG. 4 being further installed with a fan (F101) for blowing air flow to pass through the evaporator (EVA100) and a fan (F102) for blowing air flow to pass through the condenser (CON100).

As shown in FIG. 6, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processers and related softwares, and provided for receiving commands sent by the operation input device (OID100), the detected signals sent by the liquid refrigerant detector (HD100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

Fan (F101): constituted by a fan driven by an electric motor or the mechanical revolving force, and provided for blowing air flow to pass through the evaporator (EVA100), such that the air and the evaporator (EVA100) exchange heat then be discharged;

Fan (F102): constituted by a fan driven by an electric motor or the mechanical revolving force, and provided for blowing air flow to pass through the condenser (CON100), such that the air and the condenser (CON100) exchange heat;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 7:
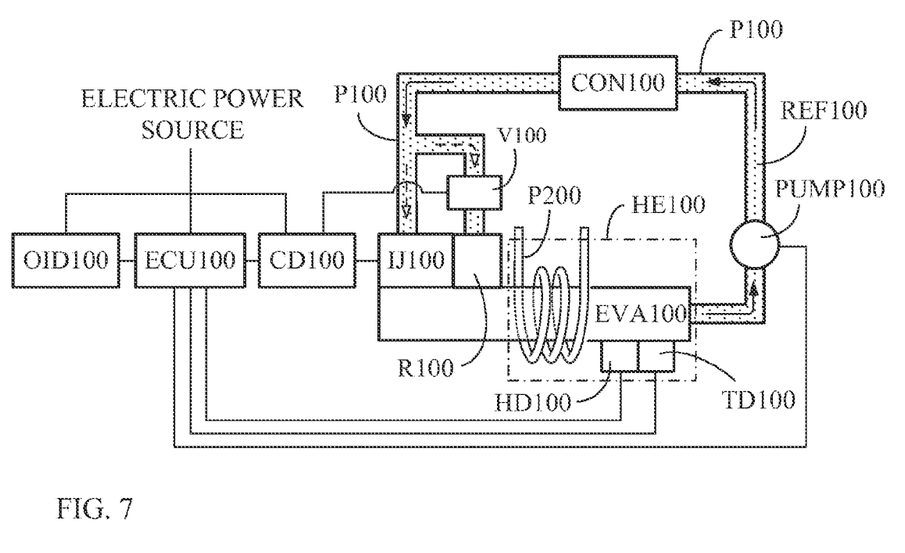
FIG. 7 is a system block diagram showing the evaporator (EVA100) of FIG. 4 being further combined with a heat exchanger (HE100).

FIG. 7 is a system block diagram showing the evaporator (EVA100) of FIG. 4 being further combined with a heat exchanger (HE100).

As shown in FIG. 7, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processers and related softwares, and provided for receiving commands sent by the operation input device (OID100), the detected signals sent by the liquid refrigerant detector (HD100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

Heat exchanger (HE100): constituted by a primary side evaporator (EVA100) and a secondary side pipeline (P200) to be in a structure of being combined with each other for transferring thermal energy;

Secondary side pipeline (P200): served as a secondary side pipeline for the heat exchanger (HE100) and allowing gas or liquid fluid to pass through;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

Figure 8:
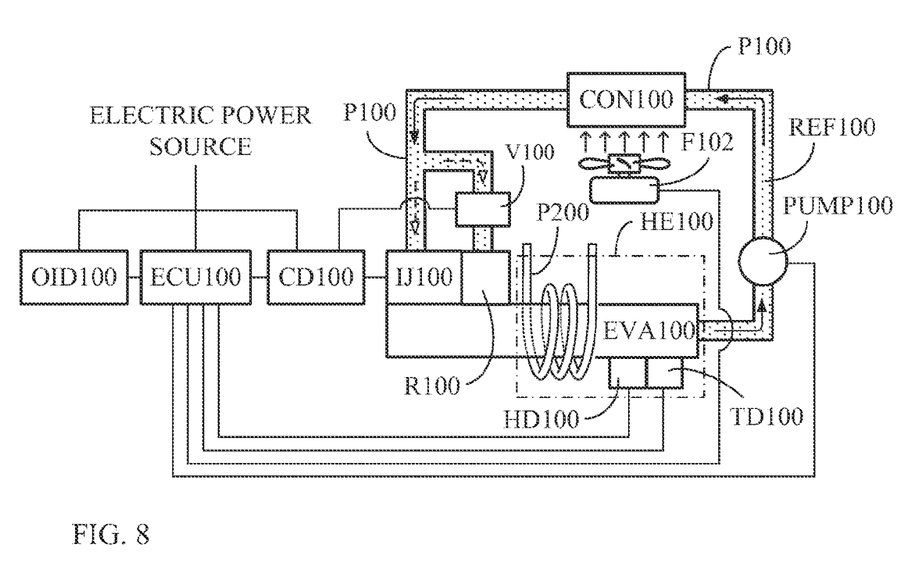
FIG. 8 is a system block diagram showing FIG. 7 being further installed with a fan (F102).

FIG. 8 is a system block diagram showing FIG. 7 being further installed with a fan (F102).

As shown in FIG. 8, it mainly consists of:

Operation input device (OID100): constituted by manually-operated electromechanical interfaces or by circuit devices for inputting analog or digital operation signals, and provided for controlling the system to be actuated or stopped, selecting the operation modes, regulating temperature settings, and setting the wind output level while a fan being installed;

Temperature detector (TD100): provided for detecting the temperature generated by the evaporator and transferring to the electric control unit (ECU100);

Electric control unit (ECU100): constituted by electromechanical operation devices, solid electric circuit devices and micro processors and related softwares, and provided for receiving commands sent by the operation input device (OID100), the detected signals sent by the liquid refrigerant detector (HD100) and the detected signals sent by the temperature detector (TD100) to operate the driving circuit device (CD100) so as to control the operation schedules and operation modes of the switch valve (V100) and the pressure-reducing regulator (R100) and the refrigerant injector (IJ100);

Driving circuit device (CD100): receiving control signals from the electric control unit (ECU100) to control the switch valve (V100), so as to control the pressure-reducing regulator (R100) to transport the refrigerant (REF100), which is in a liquid state, from the condenser (CON100) into the evaporator (EVA100) or to terminate the transportation, and to control and drive the refrigerant injector (IJ100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity, or to terminate the injection of the refrigerant injector (IJ100);

Refrigerant injector (IJ100): constituted by a device having active pressurizing injection function driven by mechanical forces, electromagnetic forces, magnetostriction or piezoelectric effects, and provided for being combined with the evaporator (EVA100) or being in a integrated structure with the evaporator (EVA100), for receiving the operation driving of the driving circuit device (CD100) to inject the liquid refrigerant (REF100) from the condenser (CON100) into the evaporator (EVA100) in a column-shaped liquid state or small particle state or fine mist state according to the direction of fixed or periodical scan with respect to the operation driving and the set amount of pressurized injection and the set intensity;

Evaporator (EVA100): constituted by a material with good heat conductivity, in which a space structure is formed for allowing a fluid to pass through; the evaporator (EVA100) is installed with a refrigerant injector (IJ100) for communicating with the condenser (CON100), and is installed with a switch valve (V100) and a pressure-reducing regulator (R100) in series connection for allowing to be communicated with the condenser (CON100), such that the refrigerant (REF100) from the condenser (CON100) is able to be injected into the evaporator (EVA100), and is further installed with an outlet for discharging the refrigerant (REF100) which has been evaporated to the gas state or for discharging the liquid refrigerant (REF100) which has not completely been evaporated;

Liquid refrigerant detector (HD100): installed in the evaporator (EVA100), and provided for detecting the evaporating state of the refrigerant (REF100) inside the evaporator (EVA100), when the refrigerant (REF100) is not completely evaporated and the residual liquid refrigerant (REF100) is remained, a signal is feedback to the electric control unit (ECU100) for the electric control unit (ECU100) controlling the driving circuit device (CD100) to regulate the refrigerant injector (IJ100) for reducing the amount of refrigerant (REF100) injected into the evaporator (EVA100);

Compressing pump (PUMP100): constituted by a fluid compressing pump rotationally or reciprocally driven by mechanical forces, motor powers, or fluid motors, or engines or electromagnetic coils, and provided for compressing the gas refrigerant (REF100) from the evaporator (EVA100) to the condenser (CON100) for being transformed to the liquid state;

Condenser (CON100): constituted by a material with good heat conductivity, in which a pipeline structure is provided for allowing the refrigerant (REF100) to pass through;

Pressure-reducing regulator (R100): constituted by an expansion valve or capillary device or liquid level controlling device, and being in series connected with the switch valve (V100) then in parallel connected to the refrigerant injector (IJ100) between the condenser (CON100) and the evaporator (EVA100), for reducing pressure and regulating the refrigerant from the condenser (CON100);

Switch valve (V100): constituted by a fluid switch valve controlled by manual forces or mechanical forces or fluid forces or electromagnetic forces, and being in series connected with the pressure-reducing regulator (R100) then in parallel connected to the refrigerant injector (IJ100) between the condenser (CON100) and the evaporator (EVA100), for being controlled by the driving circuit device (CD100) so as to be opened or closed;

Pipelines (P100): providing for connecting the mentioned refrigerant injector (IJ100), the pressure-reducing regulator (R100), the switch valve (V100), the evaporator (EVA100), the compressing pump (PUMP100) and the condenser (CON100) for allowing the refrigerant (REF100) to circulate therein;

Heat exchanger (HE100): constituted by a primary side evaporator (EVA100) and a secondary side pipeline (P200) to be in a structure of being combined with each other for transferring thermal energy;

Secondary side pipeline (P200): served as a secondary side pipeline for the heat exchanger (HE100) and allowing gas or liquid fluid to pass through;

Fan (F102): constituted by a fan driven by an electric motor or the mechanical revolving force, and provided for blowing air flow to pass through the condenser (CON100), such that the air and the condenser (CON100) exchange heat;

In the mentioned temperature regulation system with hybrid refrigerant supply and regulation, through settings of the operation input device (OID100) and the control and regulation of the electric control unit (ECU100) and the driving circuit device (CD100), the following modes for supplying and regulating the refrigerant (REF100) to the evaporator (EVA100) can be achieved which include: 1) closing the switch valve (V100) and the refrigerant injector (IJ101) actively injecting the refrigerant (REF100) into the evaporator (EVA100); 2) controlling the switch valve (V100) to open for supplying the refrigerant (REF100) to the evaporator (EVA100) through the pressure-reducing regulator (R100); 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

According to the temperature regulation system with hybrid refrigerant supply and regulation of this invention, mode selections include a mode with single supply and regulation set by the operation input device (OID100) for supplying the refrigerant to the evaporator (EVA100), or several modes being mixed and operated.

According to the temperature regulation system with hybrid refrigerant supply and regulation of this invention, modes of supplying the refrigerant to the evaporator (EVA100) comprise one or more than one of the followings which include:

1) closing the switch valve (V100) and the refrigerant injector (IJ101) actively injecting the refrigerant (REF100) into the evaporator (EVA100); or 2) controlling the switch valve (V100) to open for supplying the refrigerant (REF100) to the evaporator (EVA100) through the pressure-reducing regulator (R100); or 3) alternatively utilizing the mode 1) and the mode 2) to supply the refrigerant (REF100) to the evaporator (EVA100); or 4) synchronously utilizing the mode 1) and the mode 2) to supply the refrigerant (REF100) to the evaporator (EVA100).

In practical applications, the structures of the temperature regulation system with hybrid refrigerant supply and regulation provided by the present invention are as followings:

According to the temperature regulation system with hybrid refrigerant supply and regulation of this invention, the quantity of the refrigerant injector (IJ100) installed on the evaporator (EVA100) is one or more than one.

According to the temperature regulation system with hybrid refrigerant supply and regulation of this invention, the evaporator (EVA100) and the refrigerant injector (IJ100) are individually structured or integrally structured.

According to the temperature regulation system with hybrid refrigerant supply and regulation of this invention, the series-connected switch valve (V100) and the pressure-reducing regulator (R100) installed between the evaporator (EVA100) and the fluid outlet of the condenser (CON100) includes one or more than one series-connected combinations.

According to the temperature regulation system with hybrid refrigerant supply and regulation of this invention, the switch valve (V100) and the pressure-reducing regulator (R100) are individually structured or integrally structured.

According to the temperature regulation system with hybrid refrigerant supply and regulation of this invention, the evaporator (EVA100), the refrigerant injector (IJ100), the switch valve (V100) and the pressure-reducing regulator (R100) are individually structured or two or more than two thereof are integrally structured.

According to the temperature regulation system with hybrid refrigerant supply and regulation of this invention, the driving circuit device (CD100) can further control the refrigerant injected by the refrigerant injector (IJ100) to be in a column-shaped liquid state or small particle state or fine mist state.

According to the temperature regulation system with hybrid refrigerant supply and regulation of this invention, the driving circuit device (CD100) can further control the injection direction of the refrigerant injector (IJ100) which includes continuous or intermittence or periodical scan in variable injection directions.

The temperature regulation system with hybrid refrigerant supply and regulation includes being applied in an integral or separation type cold/warm air conditioner, icy water type air conditioner, refrigerator, freezers or in a regulation device for lowering/increasing temperature or dehumidifying.

The invention claimed is:

1. A temperature regulation system with a hybrid refrigerant supply, comprising:
    an operation input device (OID100) for inputting operation signals to control actuation or stopping of the system, select operation modes, regulate temperature settings, and set an air output level when a fan is installed;
    a condenser (CON100);
    an evaporator (EVA100);
    a refrigerant injector (IJ100) for increasing a pressure of a liquid refrigerant (REF100) supplied from the condenser (CON100) to the refrigerant injector (IJ100) and, after the pressure of the liquid refrigerant (REF100) has been increased by the refrigerant injector (IJ100), injecting the pressurized liquid refrigerant (REF100) into the evaporator (EVA100) for evaporation, said refrigerant injector (IJ100) being connected to the evaporator (EVA100) to provide a first path through which the liquid refrigerant enters the evaporator (EVA100);
    a compressing pump (PUMP100) for compressing the evaporated refrigerant (REF100) from the evaporator (EVA100) and supplying the evaporated and compressed refrigerant (REF100) to the condenser (CON100) for transformation into a liquid;
    a switch valve (V100) connected between the condenser (CON100) and the evaporator (EVA100) and arranged to open and close;
    a pressure-reducing regulator (R100) connected in series between the switch valve (V100) and the evaporator (EVA100), said series-connected pressure-reducing regulator (R100) and switch valve (V100) being further connected in parallel with the refrigerant injector (IJ100) to provide a second path parallel to the first path through which the liquid refrigerant enters the evaporator, for reducing a pressure of the liquid refrigerant (REF100) supplied by the condenser (CON100) to the refrigerant injector (IJ100) by selectively diverting a portion of the liquid refrigerant (REF100) through the switch valve (V100) to the pressure-reducing regulator (R100) for entry into the evaporator through said parallel second path;
    pipelines (P100) for connecting and carrying the refrigerant (REF100) between the refrigerant injector (IJ100), pressure-reducing regulator (R100), switch valve (V100), evaporator (EVA100), compressing pump (PUMP100), and condenser (CON100) to enable the refrigerant (REF100) to circulate,
    a driving circuit device (CD100) for: (a) operating the switch valve (V100) to control a flow of liquid refrigerant (REF100) to the pressure-reducing regulator (R100) and the refrigerant injector (IJ100), (b) controlling operation of the pressure-reducing regulator (R100), and for (c) controlling operation of the refrigerant injector (IJ100) to inject the liquid refrigerant (REF100) into the evaporator (EVA100); and
    an electric control unit (ECU100) connected to receive the operation signals from the operation input device (OID100) and for supplying control signals to the driving circuit device (CD100) to control operation schedules and operation modes of the switch valve (V100), the pressure-reducing regulator (R100), and the refrigerant injector (IJ100), said operation modes including the following:
    (1) closing the switch valve (V100) and causing the refrigerant injector (IJ100) to actively inject the refrigerant (REF100) into the evaporator (EVA100);
    (2) opening the switch valve (V100) to cause the refrigerant (REF100) to be supplied to the evaporator (EVA100) through the pressure-reducing regulator (R100);
    (3) alternating between mode (1) and mode (2);
    (4) synchronously utilizing mode (1) and mode (2) to supply the refrigerant (REF100) to the evaporator (EVA100) through both the refrigerant injector (IJ100) and the pressure-reducing regulator (R100).

2. A temperature regulation system with a hybrid refrigerant supply as claimed in claim 1, further comprising a temperature detector (TD100) for detecting a temperature generated by the evaporator, wherein said electronic control unit (ECU100) controls said operation schedules and modes of the switch valve (V100), the pressure-reducing regulator (R100), and the refrigerant injector (IJ100) in response to temperature detection signals from the temperature detector (TD100).

3. A temperature regulation system with a hybrid refrigerant supply as claimed in claim 1, further comprising a liquid refrigerant detector (HD100) installed in the evaporator for detecting an evaporation state of the refrigerant (REF100) and, when the refrigerant (REF100) is not completely evaporated, sending a feedback signal to the electric control unit (ECU100) to control the refrigerant injector (IJ100) to reduce an amount of refrigerant (REF100) injected into the evaporator (EVA100).

4. A temperature regulation system with a hybrid refrigerant supply as claimed in claim 3, further comprising a temperature detector (TD100) for detecting a temperature generated by the evaporator, wherein said electronic control unit (ECU100) controls said operation schedules and modes of the switch valve (V100), the pressure-reducing regulator (R100), and the refrigerant injector (IJ100) in response to temperature detection signals from the temperature detector (TD100).

5. A temperature regulation system with a hybrid refrigerant supply as claimed in claim 4, further comprising a fan (F101) for blowing air through the evaporator (EVA100), said fan (F101) being controlled by the electric control unit (ECU100) in response to feedback from at least one of the temperature detector (TD100) and the liquid refrigerant detector (HD100).

6. A temperature regulation system with a hybrid refrigerant supply as claimed in claim 5, further comprising a second fan (F102) controlled by the electric control unit (ECU100) for blowing air through the condenser (CON100).

7. A temperature regulation system with a hybrid refrigerant supply as claimed in claim 1, wherein the evaporator (EVA100) is included in a heat exchanger (HE100) having a secondary side pipeline (P200), the heat exchanger (HE100) transferring heat between the refrigerant (REF100) in the evaporator (EVA100) and a fluid in the secondary side pipeline (P200).

8. A temperature regulation system with a hybrid refrigerant supply as claimed in claim 7, further comprising a liquid refrigerant detector (HD100) installed in the evaporator for detecting an evaporation state of the refrigerant (REF100) and, when the refrigerant (REF100) is not completely evaporated, sending a feedback signal to the electric control unit (ECU100) to control the refrigerant injector (IJ100) to reduce an amount of refrigerant (REF100) injected into the evaporator (EVA100).

9. A temperature regulation system with a hybrid refrigerant supply as claimed in claim 8, further comprising a temperature detector (TD100) for detecting a temperature generated by the evaporator, wherein said electronic control unit (ECU100) controls said operation schedules and modes of the switch valve (V100), the pressure-reducing regulator (R100), and the refrigerant injector (IJ100) in response to temperature detection signals from the temperature detector (TD100).

10. A temperature regulation system with a hybrid refrigerant supply as claimed in claim 9, further comprising a fan (F102) controlled by the electric controlled by the electric control unit (ECU100) for blowing air through the condenser (CON100).

11. A temperature regulation system with a hybrid refrigerant supply as claimed in claim 1, wherein the system is included in one of an air conditioner, refrigerator, freezer, temperature regulation device, and dehumidifier.

12. A temperature regulation system with a hybrid refrigerant supply as claimed in claim 2, wherein the system is included in one of an air conditioner, refrigerator, freezer, temperature regulation device, and dehumidifier.

13. A temperature regulation system with a hybrid refrigerant supply as claimed in claim 3, wherein the system is included in one of an air conditioner, refrigerator, freezer, temperature regulation device, and dehumidifier.

14. A temperature regulation system with a hybrid refrigerant supply as claimed in claim 4, wherein the system is included in one of an air conditioner, refrigerator, freezer, temperature regulation device, and dehumidifier.

15. A temperature regulation system with a hybrid refrigerant supply as claimed in claim 5, wherein the system is included in one of an air conditioner, refrigerator, freezer, temperature regulation device, and dehumidifier.

16. A temperature regulation system with a hybrid refrigerant supply as claimed in claim 6, wherein the system is included in one of an air conditioner, refrigerator, freezer, temperature regulation device, and dehumidifier.

17. A temperature regulation system with a hybrid refrigerant supply as claimed in claim 7, wherein the system is included in one of an air conditioner, refrigerator, freezer, temperature regulation device, and dehumidifier.

18. A temperature regulation system with a hybrid refrigerant supply as claimed in claim 8, wherein the system is included in one of an air conditioner, refrigerator, freezer, temperature regulation device, and dehumidifier.

19. A temperature regulation system with a hybrid refrigerant supply as claimed in claim 9, wherein the system is included in one of an air conditioner, refrigerator, freezer, temperature regulation device, and dehumidifier.

20. A temperature regulation system with a hybrid refrigerant supply as claimed in claim 10, wherein the system is included in one of an air conditioner, refrigerator, freezer, temperature regulation device, and dehumidifier.

21. A temperature regulation system with a hybrid refrigerant supply as claimed in claim 1, wherein the driving circuit device (CD100) controls the refrigerant injector (IJ100) to inject the liquid refrigerant (REF100) from the condenser (CON100) into the evaporator (EVA100) in one of a column-shaped liquid state, a small particle state, or a fine mist state.

22. A temperature regulation system with a hybrid refrigerant supply as claimed in claim 1, wherein refrigerant injector (IJ100) is one of a mechanical, electromechanical, magnetostrictive, and piezoelectric injection device that is combined or integrated with the evaporator (EVA100) to inject the liquid refrigerant (REF100) from the condenser (CON100) into the evaporator (EVA100) in one of a column-shaped liquid state, a small particle state, or a fine mist state.

* * * * *